United States Patent
Oh et al.

(10) Patent No.: US 8,378,548 B2
(45) Date of Patent: Feb. 19, 2013

(54) CURRENT CONTROL ASSEMBLY WITH DRAINAGE AND SLINGER

(75) Inventors: Hieyoung W. Oh, Bowdoin, ME (US); Jeffrey W. Richardson, Otisfield, ME (US)

(73) Assignee: Illinois Tool Works Inc., Glenview, IL (US)

(*) Notice: Subject to any disclaimer, the term of this patent is extended or adjusted under 35 U.S.C. 154(b) by 350 days.

(21) Appl. No.: 12/772,123

(22) Filed: Apr. 30, 2010

(65) Prior Publication Data

US 2011/0062818 A1 Mar. 17, 2011

Related U.S. Application Data

(60) Provisional application No. 61/243,447, filed on Sep. 17, 2009.

(51) Int. Cl.
  *H02K 13/00* (2006.01)
(52) U.S. Cl. .......................................... 310/228; 310/88
(58) Field of Classification Search .................... 310/88, 310/228; 361/220, 221, 222, 212
  See application file for complete search history.

(56) References Cited

U.S. PATENT DOCUMENTS

| | | | |
|---|---|---|---|
| 5,661,356 A | 8/1997 | Fisher et al. | |
| 6,425,736 B1 | 7/2002 | McMahon et al. | |
| 6,647,242 B2 | 11/2003 | Gagnon et al. | |
| 6,952,555 B2 | 10/2005 | Oh et al. | |
| 7,036,814 B2 | 5/2006 | Oh et al. | |
| 7,136,271 B2 | 11/2006 | Oh et al. | |
| 7,193,834 B2 | 3/2007 | Oh et al. | |
| 7,193,836 B2 * | 3/2007 | Oh et al. | 361/220 |
| 7,241,253 B2 | 7/2007 | Oh et al. | |
| 7,261,146 B2 | 8/2007 | Oh | |
| 7,339,777 B2 | 3/2008 | Barnard et al. | |
| 7,498,703 B2 * | 3/2009 | Rea et al. | 310/71 |
| 7,521,827 B2 * | 4/2009 | Orlowski et al. | 310/68 R |
| 7,528,513 B2 | 5/2009 | Oh | |
| 7,652,866 B2 | 1/2010 | Barnard et al. | |
| 2005/0145125 A1 | 7/2005 | Oh et al. | |
| 2006/0007609 A1 * | 1/2006 | Oh et al. | 361/23 |
| 2007/0278093 A1 | 12/2007 | Barnard et al. | |
| 2008/0258576 A1 | 10/2008 | Oh et al. | |
| 2008/0272101 A1 | 11/2008 | Oh et al. | |
| 2009/0045694 A1 | 2/2009 | Oh et al. | |
| 2009/0129043 A1 | 5/2009 | Oh et al. | |

FOREIGN PATENT DOCUMENTS

EP 1523086 4/2005
WO WO2006115600 11/2006

* cited by examiner

*Primary Examiner* — Nguyen N Hanh
(74) *Attorney, Agent, or Firm* — Fletcher Yoder P.C.

(57) ABSTRACT

The present approaches provide a current control assembly with a rotor and a stator. The stator includes a drain for channeling contaminants away from the assembly and the rotor includes one or more slots that rotate with the rotor for outwardly slinging the contaminants. In one embodiment, a system is provided that includes the current control assembly having a first ring including a first shaft opening and a first discharge opening. The current control assembly also includes a second ring having a second shaft opening and a second discharge opening, wherein the first and second rings rotate relative to one another, and the first and second discharge openings align with one another to discharge a contaminant. The current control assembly further includes a plurality of conductive filaments configured to transfer current between the current control assembly and a shaft.

20 Claims, 9 Drawing Sheets

CURRENT CONTROL ASSEMBLY WITH DRAINAGE AND SLINGER

CROSS REFERENCE TO RELATED APPLICATION

This application claims priority to and the benefit of U.S. Provisional Patent Application Ser. No. 61/243,447, entitled "Shaft Current Control Brush Assembly with Drainage and Slinger," filed on Sep. 17, 2009, which is hereby incorporated by reference in its entirety.

BACKGROUND

This section is intended to introduce the reader to various aspects of art that may be related to various aspects of the present system and techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present embodiments generally relate to grounding assemblies, and, more particularly, to grounding assemblies for motor shafts, turbine shafts and other rotating shafts conductively linked to components that create an electrical charge, or that may experience a build-up of electrical charge.

Electric motors often experience induced electrical currents in shafts. More particularly, motors employing variable speed drives that utilize pulse width modulation technology to vary the speed of motors have an increased susceptibility to such currents. For example, using motors with variable speed drives includes the caveat of a higher common mode voltage (CMV) generated by the variable speed drive, which increases shaft induced currents.

Voltage on the motor shaft induces current flow through the shaft bearings to the motor frame and then to ground. During motor operation, charge may build up on the shaft surfaces. In some instances, electrical discharge may occur, which causes electric discharge machining (EDM). EDM can damage the surfaces of shaft bearings and the balls in the bearings. The electrical discharge may create fusion craters, and particulate from the crater formation may remain inside the sealed bearing. Both the fusion crater and the particulate material in the bearing act to disturb the free flow rotation of the bearing, which can lead to physical damage and premature failure of various motor components.

The accumulated liquid can interfere with the operation and performance of the grounding assembly. In certain situations, various contaminants can migrate to the current control portion of the assembly. These contaminants may not allow proper performance of the assembly, causing which can result in damage to the shaft, bearings, or motor, resulting in deteriorated performance. Furthermore, removal of the assembly for periodic cleaning is time-consuming and may not be practical for substantially continuously operating equipment.

BRIEF DESCRIPTION

In one aspect of the approaches described herein, a system is provided that includes a current control assembly. The current control assembly includes a rotor having a first shaft opening and a plurality of first discharge openings. The current control assembly also includes a stator having a second shaft opening and a second discharge opening, wherein the first and second discharge openings periodically align with one another during rotation of the rotor to discharge a contaminant. The plurality of first discharge openings is configured to discharge the contaminant at least partially due to a centrifugal force during rotation of the rotor, and the plurality of first discharge openings is configured to pressurize an interior of the current control assembly to resist entry of the contaminant during rotation of the rotor. A plurality of conductive filaments is coupled to the stator, wherein the plurality of conductive filaments is configured to transfer current between the current control assembly and a shaft.

In another aspect of the approaches described herein, a system is provided that includes a current control assembly having a first ring including a first shaft opening and a first discharge opening. The current control assembly also includes a second ring having a second shaft opening and a second discharge opening, wherein the first and second rings rotate relative to one another, and the first and second discharge openings align with one another to discharge a contaminant. The current control assembly further includes a plurality of conductive filaments configured to transfer current between the current control assembly and a shaft.

In a further aspect of the approaches described herein, a system is provided that includes a current control assembly. The current control assembly has a rotor having a first axial opening and a first radial opening, wherein the first radial opening is configured to discharge a contaminant. The current control assembly also includes a stator having a second axial opening, wherein the first and second axial openings are aligned with one another to receive a shaft. The current control assembly also includes a plurality of conductive filaments configured to transfer current between the current control assembly and the shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present approaches will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present approaches provide a current control assembly with a rotor and a stator. The stator includes a drain for channeling contaminants away from the assembly and the rotor includes one or more slots that rotate with the rotor for outwardly slinging the contaminants.

Figure 1:
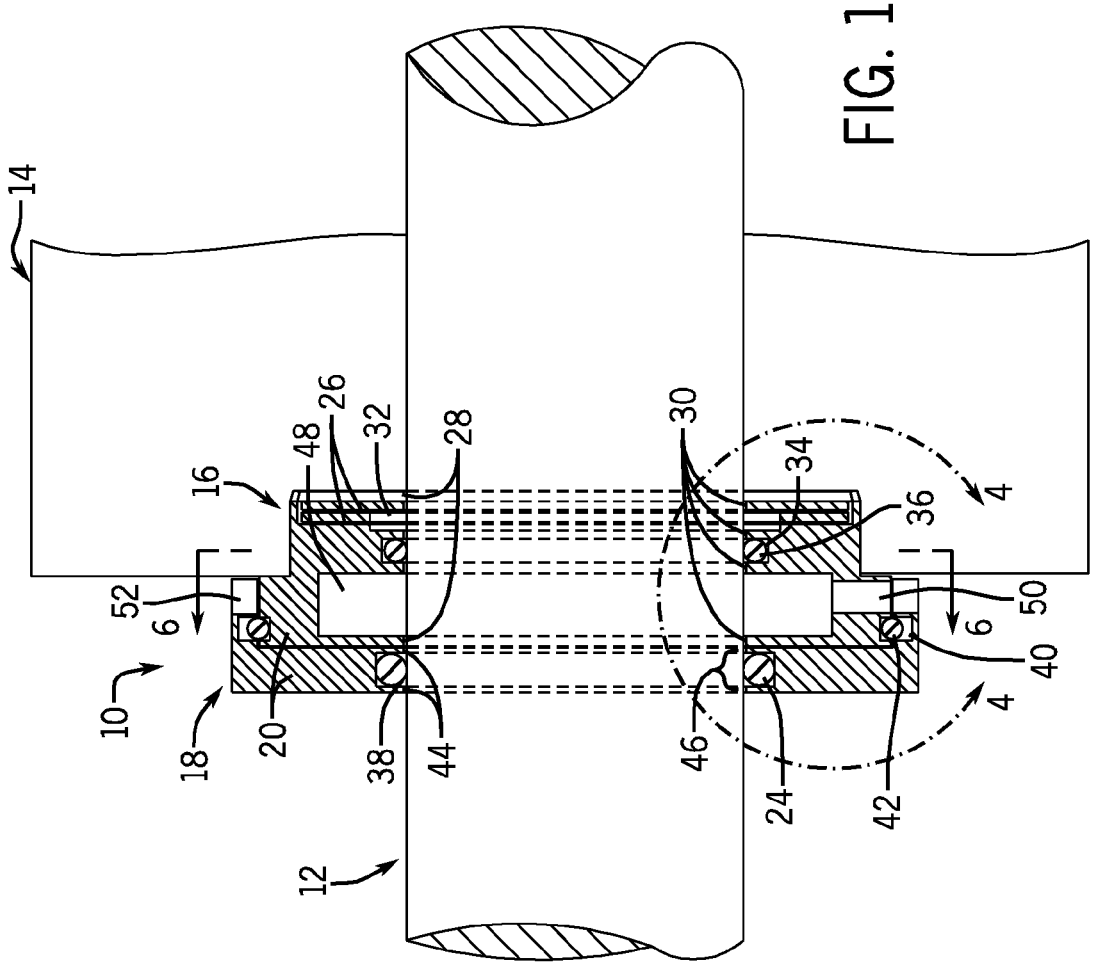
FIG. 1 is a cross-sectional side view of a current control assembly having unique rotor and slinger features in accordance with one aspect of the present approaches.

Moving now to the drawings and referring initially to FIG. 1, a cross-sectional view of a current control assembly 10 is illustrated. The current control assembly 10, as illustrated, is configured to control an electrical current building up or flowing through a shaft 12 portion of a motor or rotating equipment housing 14, such as a faceplate of a motor. The current control assembly 10 generally includes an annular stator 16 coupled to the motor housing 14 and an annular rotor/slinger 18 removably mounted to the shaft 12. The rotor/slinger 18 and stator 16 may be constructed of a common material 20, such as aluminum, stainless steel, brass, copper, bronze, or similar material. In some embodiments, the material 20 may be plastic, such as a conductive plastic. In the illustrated embodiment, the stator 16 and rotor/slinger 18 are generally ring or annular shaped and are configured to receive and encircle the shaft 12, although non-circular shapes are also contemplated. For example, the stator 16 and/or rotor slinger 18 may include non-circular portions, such as a square portion of the stator 16 to fit into the motor housing 14. Further, it should be noted that the rotor/slinger 18 and stator 16 may be designed in any size and spatial relationship, and may be designed to receive shafts having any diameter. Additionally, the stator 16 and rotor/slinger 18 may both be configured to rotate. In such embodiments, the rotor/slinger 18 may rotate at a different rate than the stator 16. Such designs are contemplated herein and are well within the scope of the present disclosure.

The current control assembly 10 may serve a number of functions, including keeping the shaft 12 and the internal portions of the current control assembly 10 substantially free of liquid or debris contaminants and controlling a charge building up or flowing through the shaft 12. For example, in the illustrated embodiment, the stator 16 is mounted to the motor housing 14 at least partially via an anchor structure 22 (FIG. 2), which may be a part of the housing of the stator 16 (the material 20), or may be a separate conductive material. The anchor structure 22 may be secured to the motor housing 14 by an interference fit, a friction fit, a mating coupling, threading, adhesive bonding, and so forth. Essentially, the anchor structure 22 may provide an electrical ground to various components of the current control assembly 10, as will be discussed in further detail below. Securing the stator 16 in such a way helps to ensure that the charge building up or flowing through the shaft 12 is substantially continuously controlled. Moreover, the anchor structure 22 may be fixed to the motor housing 14 in a semi-permanent or substantially permanent manner. The rotor/slinger 18 may be removably coupled to the shaft 12 by a drive O-ring 24 constructed from a suitable resilient material (e.g., a rubber) that is able to prevent the surface of the shaft 12 from directly abutting the material 20 of the rotor/slinger 18. Further, the drive O-ring 24 enables the rotor/slinger 18 to rotate along with the shaft 12, the act of which may allow the rotor/slinger 18 to sling any contaminants away from the shaft 12 and/or current control assembly 10, as will be discussed in further detail below.

During operation of the motor, conductive filaments 26 within the stator 16 may substantially control the current building up or flowing through the shaft 12. At substantially the same time, the rotor/slinger 18 may rotate in relation to the stator 16, either at substantially the same rate as the shaft 12 (due at least in part to the drive O-ring 24), or at a different rate. Nevertheless, the rotor/slinger 18 rotates and slings debris/liquid away from the assembly 10 by rotating with the shaft 12 while adjacent to the stator 16.

The conductive filaments 26 of the stator 16 serve to transfer charge (electrons) between the control assembly 10 and the shaft 12. For example, the conductive filaments 26 may directly contact the shaft 12 during rotation, or may remain at a distance that is sufficient to transfer a charge. The conductive filaments 26 may be fibers, such as any tubular structure constructed from a material that is both resilient (able to bend and substantially return to its original shape) and sufficiently conductive. For example, the conductive filaments 26 may bend in response to air pressure caused by rotation of the shaft 12. In such situations, the distance between the bent filaments 26 and the surface of the shaft 12 may be such that the filaments 26 are still able to transfer charge between the shaft 12 and the assembly 10. Furthermore, the conductive filaments 26 may be sufficiently soft so as to not abrade the surface of the shaft 12. For example, the conductive filaments 26 may not be constructed solely of a thin metal wire, as such a material may tend to abrade the shaft 12 and/or degrade the performance of the assembly 10. However, the conductive filaments 26 may be constructed of a material containing at least a portion of metal. Regardless, the conductive filaments 26 may have a coefficient of friction between the filaments 26 and the shaft 12 that is sufficiently small such that the shaft 12 does not wear. Of course, in embodiments where the conductive filaments 26 do not touch the shaft 12, a metal filament may be used.

Thus, the conductive filaments 26 may be constructed from a conductive or semi-conductive material, depending upon implementation-specific designs and requirements. As an example, the conductive filaments 26 may be constructed from silicon-containing materials such as silicon fibers or silicon nanotubes, carbon materials such as carbon fibers, carbon nanotubes, or graphene materials, or conductive polymers such as conductive synthetic polymers and conductive natural polymers, metal coated fibers, and so forth. Further, the filaments 26 may be nanofibers, microfibers, or larger. In some embodiments, the diameters of the filaments 26 may be of a size suitable for inducing ionization at the ends (i.e., tips)

of the filaments 26. In one embodiment, a suitable size may be smaller than approximately 500 microns. That is, the filaments 26 may have diameters ranging anywhere from approximately 2, 10, 20, 200, 400, 600, or 800 nanometers (nm) to approximately 1, 2, 5, 10, 100, 200, 300, 400, or 500 microns and above. For example, the conductive filaments 26 may have diameters between approximately 1 and 150, 2 and 145, 10 and 140, 20 and 130, 30 and 120, 40 and 110, 50 and 100, 60 and 90, 70 and 80, or about 75 microns. Further, in some embodiments, the filaments 26 may be packed into bundles, such as a carpet of grown fibers, or a bundle of spun fibers. The conductive filaments 26 may be present as single bundles, or may be in multiple bundles. In some embodiments, the conductive filaments 26 may be present as continuous rows, discontinuous patches, bundles, broken rings, semi-circles, and so forth. In the illustrated embodiment, the conductive filaments 26 are disposed substantially continuously along an inner shaft opening 28 in two rows at different axial positions, where the filaments 26 may transfer current to and/or from the shaft 12.

The shaft opening 28 may be defined by a series of bores 30, which are designed to allow only a small tolerance between the shaft 12 and the stator 16, and/or to form one or more channels. For example, one or more of the bores 30 may be configured as channels, such as an annular channel 32 having the conductive filaments 26. Another of the bores 30 may form a channel 34 having an O-ring 36. The O-ring 36 may surround the shaft 12 and protrude into the channel 34 to prevent abutment of the stator 16 with the shaft 12 should any movement of the shaft 12 occur, such as from mechanical vibrations and the like.

In a similar manner, the rotor/slinger 18 may include a number of channels for housing O-rings, such as a channel 38 for housing the drive O-ring 24. The rotor/slinger 18 may also have a channel 40 for housing a locking O-ring 42, which prevents direct abutment of the rotor/slinger 18 with the stator 16 while the rotor/slinger 18 rotates. However, the locking O-ring 42 also serves to hold the rotor/slinger 18 in close proximity to the stator 16, such that the current control assembly 10 may efficiently expel contaminants, as described below. The rotor/slinger 18 includes a series of bores 44 that define the shaft opening 46. The shaft opening 46 aligns with the shaft opening 28 of the stator 16.

One unique aspect of the assembly 10 is the ability to prevent contaminants from reaching the shaft 12 and the conductive filaments 26. Accordingly, the stator 16, in addition to having the conductive filaments 26 for controlling a charge building up or flowing through the shaft 12, also includes a drainage channel 48 and a drainage port 50 for dispatching contaminants away from the shaft 12 and the assembly 10. The drainage channel 48 may be formed by one of the series of bores 30, though the diameter of the drainage channel 48 may be different than the channels mentioned previously. As can be appreciated from the illustration of FIG. 1, the drainage channel 48 is designed such that any contaminant such as debris or a liquid may be dispatched before reaching the O-ring 36. Further, the O-ring 36 may also serve as a seal against contaminants, such that contaminants may be prevented from reaching the conductive filaments 26. Nevertheless, the drainage channel 48 leads to the drainage port 50, which is disposed on a downward-facing side of the stator 16. The drainage port 50 may be so configured such that contaminants may be carried away at least partially due to the force of gravity. Other forces acting on the contaminants within the stator 16 may include air pressure within the drainage channel 48.

As illustrated, the drainage port 50 is designed such that at various times during rotation of the rotor/slinger 18, the drainage port 50 is substantially in line with a slot 52 of the rotor/slinger 18. For example, the rotor/slinger 18 may include one or more than one slot 52 (e.g., 2, 3, 4, 5, 6, 7, 8, 9, 10, 15, 20 or more slots). As the rotor/slinger 18 rotates during operation, one of the slots 52 will become periodically (at various times) aligned with the drainage port 50, allowing any contaminants in the drainage channel 48 and/or drainage port 50 to exit the assembly 10. Further, the rotation of the rotor/slinger 18 and the positioning of the slots 52 at an outer, radial point on the rotor/slinger 18 causes a centrifugal force to be exerted on the contaminants. The centrifugal force effectively slings the contaminants away from the assembly 10 (and the shaft 12). Thus, the contaminants are accelerated radially away from the assembly 10. As a result, air may rush into the drainage channel 48 in an attempt to equilibrate the pressure between the outer atmosphere and the drainage channel 48. Accordingly, due to the acceleration of the contaminants away from the assembly 10, the drainage channel 48 may experience a rapid change in pressure, in effect preventing more contaminants from entering the assembly 10 and pumping any contaminants in the drainage channel 48 out. Further, the rotation of the rotor/slinger 18 relative to the stator 16 may allow the slots 52 to shear and sling any viscous contaminants or debris away from the drainage port 50. The slinging and shearing effect of the slots 52 may prevent the drainage port 50 from becoming clogged or plugged, and may serve to significantly extend the life of the current control assembly 10.

Figure 2:
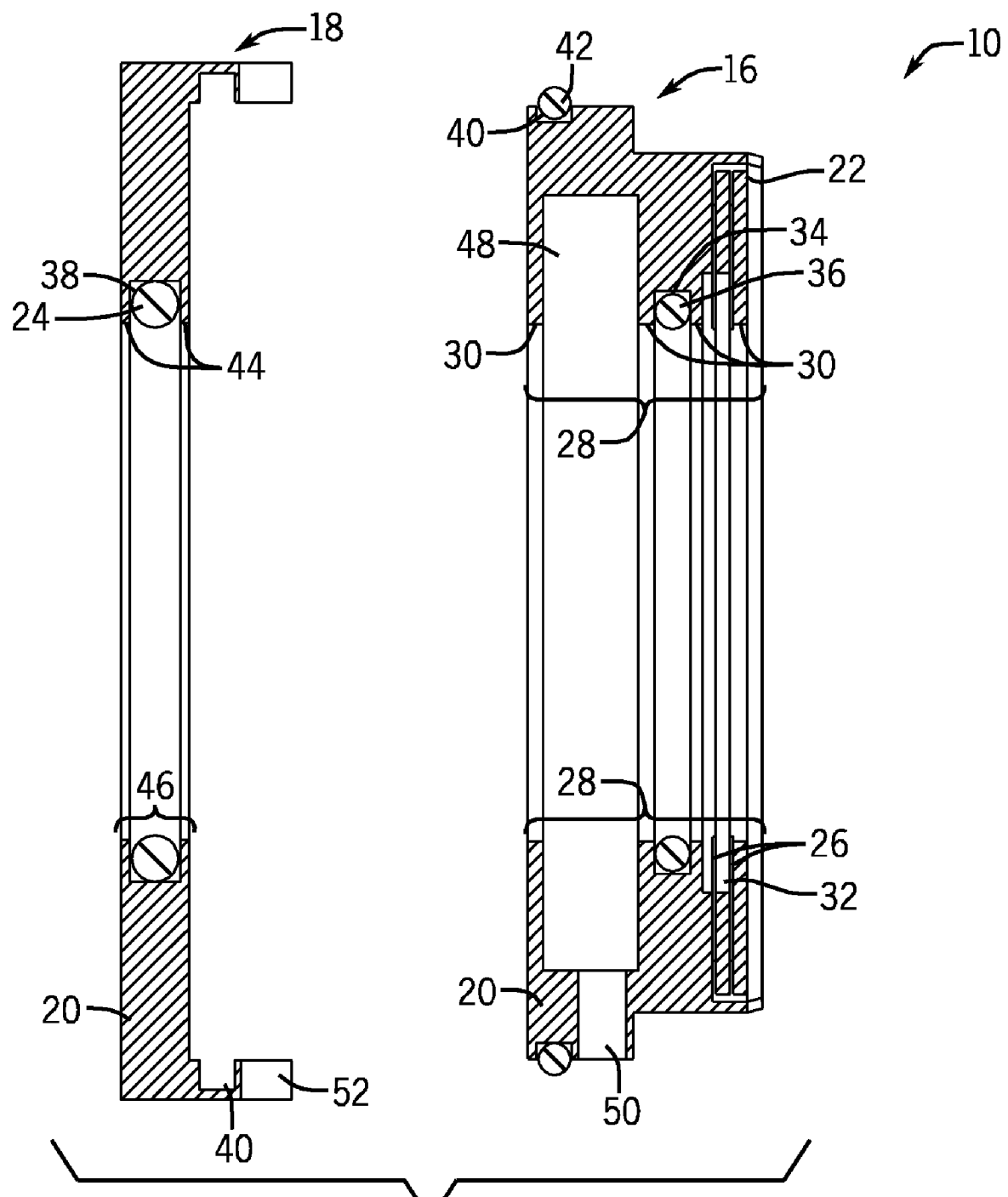
FIG. 2 is a partial exploded cross-sectional side-view of the unique rotor and stator of FIG. 1.

The spatial relation between the rotor/slinger 18 and the stator 16 may be further appreciated in the illustration of FIG. 2. FIG. 2 illustrates the rotor/slinger 18 and the stator 16 as separated from one another and removed from the shaft 12 and motor housing 14 depicted in FIG. 1. In particular, the separation point is at the channel 40. The channel 40, when the current control assembly 10 is assembled, houses the locking O-ring 42, which is illustrated as coupled to the stator 16. In FIG. 2, a portion of the channel 40 is illustrated as remaining with the stator 16, while another portion of the channel 40 is illustrated as bored into the rotor/slinger 18. As mentioned, when the current control assembly 10 is assembled, the locking O-ring 42 prevents abutment of the rotor/slinger 18 with the stator 16 during rotation. Further illustrated in FIG. 2 is the drive O-ring 24, which is coupled to both the rotor/slinger 18 and the shaft 12, as illustrated in FIG. 1. For example, the drive O-ring 24 may be fit into the rotor/slinger 18 via an interference or friction fit in the channel 38, or may be adhesively secured to the channel 38. In some embodiments, the drive O-ring 24 may have at least some elasticity that allows it to be pulled and secured around the shaft 12 when securing the assembly 10 to the shaft 12. Further, the series of bores 44 in the rotor/slinger 18 provide clearance between the surface of the shaft 12 and the rotor/slinger 18. The bores 44, together with the channel 38 form the shaft opening 46, which allows the rotor/slinger 18 to receive and encircle the shaft 12.

As mentioned, the rotor/slinger 18 may include one or more slots 52 (e.g., between approximately 2 and 20, 4 and 12, or 6 and 10) that are designed to sling contaminants away from the assembly 10 during operation. More specifically, when the rotor/slinger 18 rotates in relation to the stator 16, the slots 52 cause a centrifugal force to be applied to contaminants exiting the drainage port 50 of the stator 16. Again, the slots 52 may shear debris and/or contaminants off of the drainage port 50 to prevent clogging.

As with the rotor/slinger 18, the stator 16, as mentioned, has the series of bores 30, the drainage channel 48, and the channel 34 with the O-ring 36, all of which define the shaft opening 28. The shaft opening 28 allows the stator 16 to receive and encircle the shaft 12. Further, the O-ring 36 buffers movement of the shaft 12 in relation to the stator 16, such that the two do not collide or abut. As mentioned, the drainage channel 48, in addition to trapping contaminants, leads to the drainage port 50, which allows the contaminants to exit the assembly 10. Further, both the drainage channel 48 and the drainage port 50 may experience a pumping force as a result of the periodic (occurring at varying times) overlap between the rotating slots 52 and the drainage port 50.

In addition to including the unique contaminant-clearing features described above, as mentioned, the stator 16 also includes a series of conductive filaments 26. The conductive filaments 26 are designed to transfer charge between the current control assembly 10 and the shaft 12. For example, the conductive filaments 26 may shuttle electrons through direct contact with the surface of the shaft 12, or may shuttle electrons through a small space between the ends of the conductive filaments 26 and the shaft 12. In the latter case, the space may be sufficiently small as to allow such charge transfer processes to occur. In the illustrated embodiment, the conductive filaments 26 are disposed in the channel 32, though such a configuration may be changed in other embodiments, such as the removal of the channel 32, which is described in further detail below with respect to FIG. 5.

Figure 3:
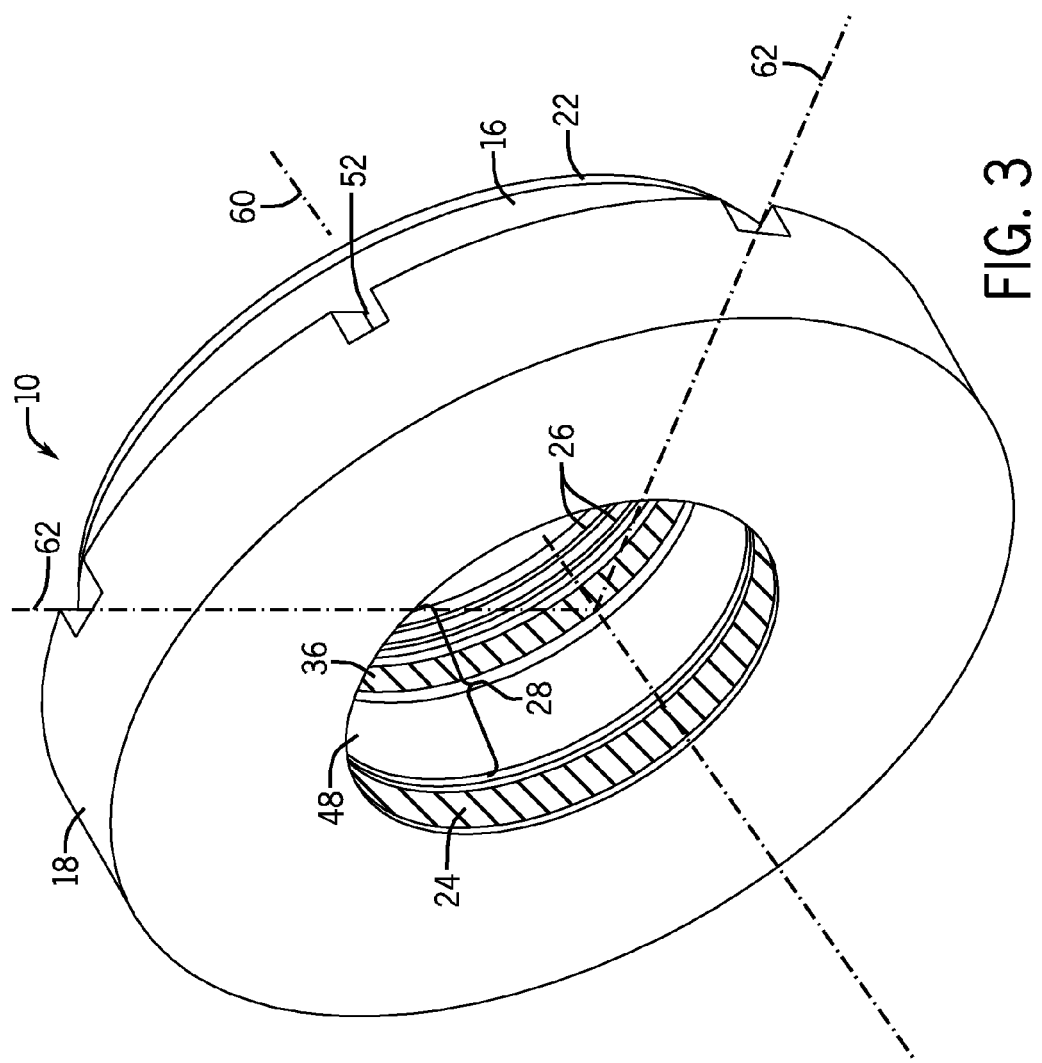
FIG. 3 is a rear perspective view of the current control assembly of FIG. 1, illustrating the unique features of the rotor and stator.

FIG. 3 is a perspective view of the current control assembly 10, which illustrates one embodiment of the relative dimensions and placement of the O-rings 24, 36, the conductive filaments 26, the drainage channel 48, and the one or more slots 52. More specifically, FIG. 3 is a perspective view of the current control assembly 10 from a front face of the rotor/stator 18. The stator 16 is also illustrated, as well as the anchor structure 22. Further illustrated in FIG. 3 is a line representing a shared rotational axis 60 of the shaft 12 and the rotor/stator 18. The shaft 12 and/or the rotor/stator may also have a series of radii 62 extending from the shared rotational axis 60. Such lines may be useful in defining the shape and extent of the slots 52, as described below with respect to FIGS. 7-12.

It may be appreciated from the view presented in FIG. 3 that a series of barriers block a contaminant from reaching the conductive filaments 26. The directional movement of the contaminant will be discussed as moving generally along a rearward direction down the rotational axis 60. For example, as illustrated, the primary barrier against the introduction of contaminants is the drive O-ring 24, which allows the rotor/stator 18 to be secured to the shaft 12 of FIG. 1. In embodiments where the contaminant passes the drive O-ring 24, the contaminant may reach the drainage channel 48, where, as mentioned, the contaminant may exit or be forced out via the drainage port 50 shown in FIGS. 1 and 2. Further, the drainage channel 48 may be an area of relatively higher pressure than is present in the surrounding environment, which may be an additional force preventing the introduction of the contaminant. As mentioned, the drainage channel 48 may experience this elevated pressure due to the substantially continuous motion of the slots 52 and their periodic (occurring at various times) overlap with the drainage port 50. In combination, the increased area of pressure within the drainage channel 48 and the rotary movement of the slots 52 serve as an additional barrier against contaminants. In the illustrated embodiment, the O-ring 36 is situated beyond the drainage channel 48. As mentioned, the O-ring 36 is designed to prevent collision and/or abutment of the stator 16 with the shaft 12, and to maintain the position of the stator 16 in relation to the shaft 12. The O-ring 36 may also serve as an additional barrier against contaminants due to the seal against the stator 16.

Figure 4:
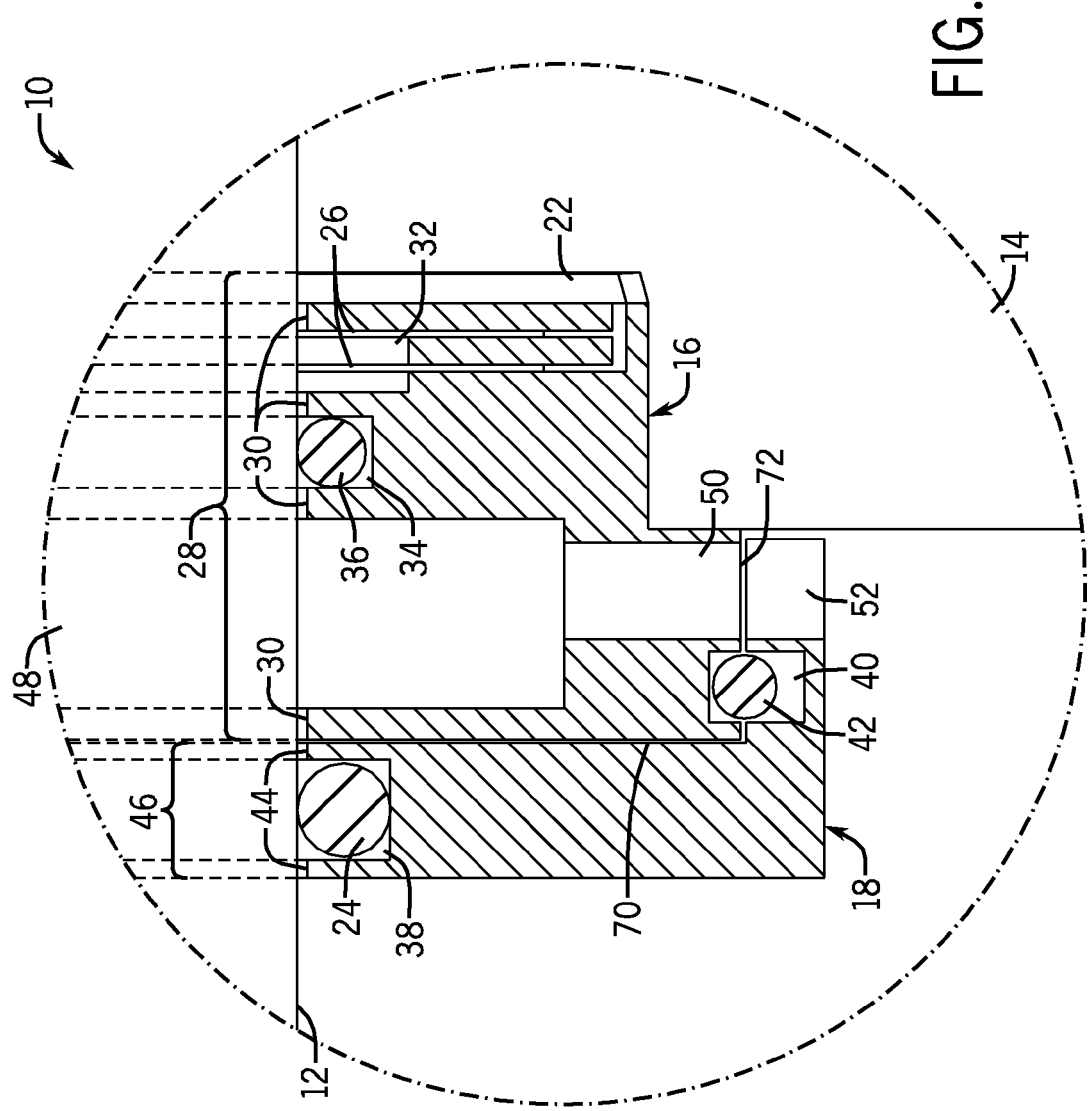
FIG. 4 is a partial cross-sectional side view within dashed circle 4-4 of FIG. 1, aligned with a slot and conductive filaments in a channel.

The conductive filaments 26, as in FIGS. 1 and 2, are illustrated as being disposed in two annular rows axially spaced apart along the inner face of the stator 16. In the illustrated embodiment, the inner face is the shaft opening 28 of the stator 16. The placement of the conductive filaments 26 may be further appreciated with reference to FIGS. 4 and 5, both of which are embodiments of the placement of the conductive filaments 26. Referring now to FIG. 4, the area 4-4 of FIG. 1 is shown in a close-up cross-sectional view. More specifically, FIG. 4 is a cross-sectional side view of the downward-facing portion of the current control assembly 10. The downward-facing portion of the assembly 10 includes the portion of the stator 16 having the drainage port 50. As illustrated, the drainage port 50 overlaps (aligns) with the slot 52.

As mentioned, the rotor/slinger 18 is designed to rotate in relation to the stator 16 to allow the slots 52 to sling any contaminants out of the drainage channel 48 and drainage port 50, and away from the assembly 10. Accordingly, there may be a tolerance 70 or small space in between the rotor/slinger 18 and the stator 16. For example, the tolerance 70 may be of a size that allows rotational movement of the rotor/slinger 18 relative to the stator 16 while substantially blocking or restricting entry of contaminants into the current control assembly 10. Further, as the drive O-ring 24 in channel 38 causes rotation of the rotor/slinger 18, the slots 52 pass over the drainage port 50 at varying times. When the slots 52 are not in alignment with the drainage port 50, the material 20 of the rotor/slinger 18 may overlap the drainage port 50, such that a tolerance 72 exists between the rotor/slinger 18 and the drainage port 50.

In some embodiments, the tolerance 70 may be substantially the same size as the tolerance 72. In other embodiments, their sizes may be different. The size of the tolerances 70, 72 may be defined by a number of features, including the relationship between the O-rings and channels. For example, the tolerances 70, 72 may be defined by the size of the drive O-ring 24 in relation to the channel 38, the size of the locking O-ring 42 in relation to the channel 40, or the size of the O-ring 36 in relation to the channel 34, or any combination thereof. Alternatively or additionally, the diameter of the shaft opening 46 of the rotor/slinger 18 in relation to the diameter of the shaft opening 28 of the stator 16 may define the size of the tolerances 70, 72. Of course, in such embodiments, the size of the shaft openings 28, 46 may depend on the series of bores 30, 44 as well. It should be noted that the size of the tolerances 70, 72 may also depend on the overall size of the current control assembly 10.

The rearward portion of the current control assembly 10, more specifically stator 16, as mentioned, includes the annular channel 32 containing a portion of the conductive filaments 26. In the configuration that is illustrated in FIG. 4, the channel 32 may provide a recess for housing a portion of the conductive filaments 26. In the illustrated embodiment, the conductive filaments 26 are electrically connected to the anchor structure 22. The anchor structure 22 secures the conductive filaments 26 within the channel 32 and provides an electrical contact or ground to the filaments 26, depending upon implementation-specific designs. In one embodiment, the conductive filaments 26 are grounded by the anchor structure 22. In some embodiments, the anchor structure 22 may be a clamping structure, such as one or more metallic plates or a filler material, such as a conductive plastic or a conductive adhesive.

Figure 5:
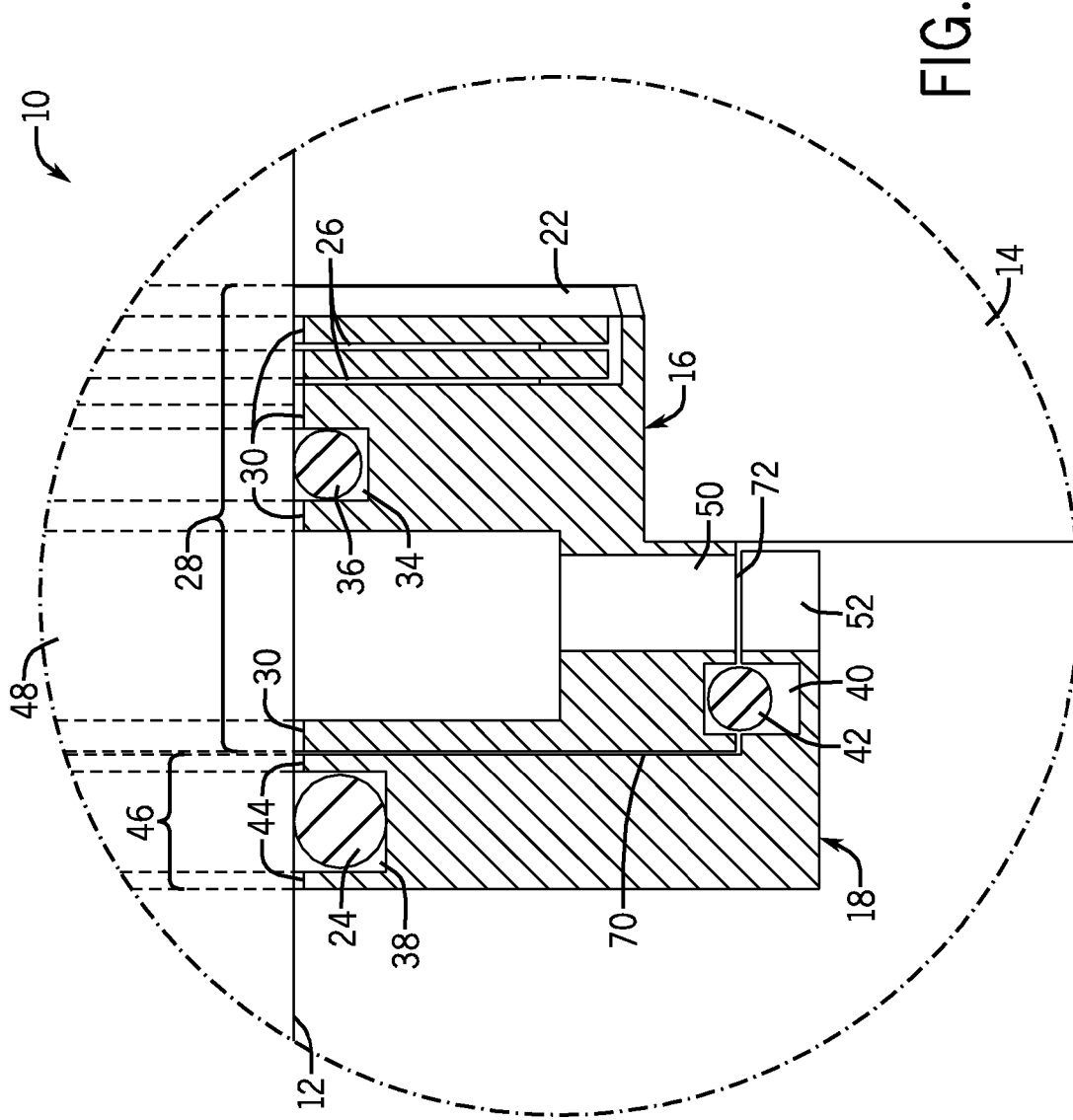
FIG. 5 is a partial cross-sectional side view within dashed circle 4-4 of FIG. 1, illustrating an alternative embodiment with the conductive filaments not disposed in a channel.

FIG. 5 illustrates an alternative embodiment to that shown in FIG. 4. More specifically, the current control assembly 10 illustrated in FIG. 5 does not include the channel 32 for housing the conductive filaments 26. As in FIG. 4, however, the conductive filaments 26 are electrically connected to and grounded by the anchor structure 22. While two embodiments have been shown, one in which the channel 32 is present and one where it is not, embodiments that vary are also contemplated herein. That is, the size and extent of the channel 32 may differ from what is illustrated in FIG. 4. For example, the channel 32 may be tapered, angled, circular, semicircular, and so forth.

Figure 6:
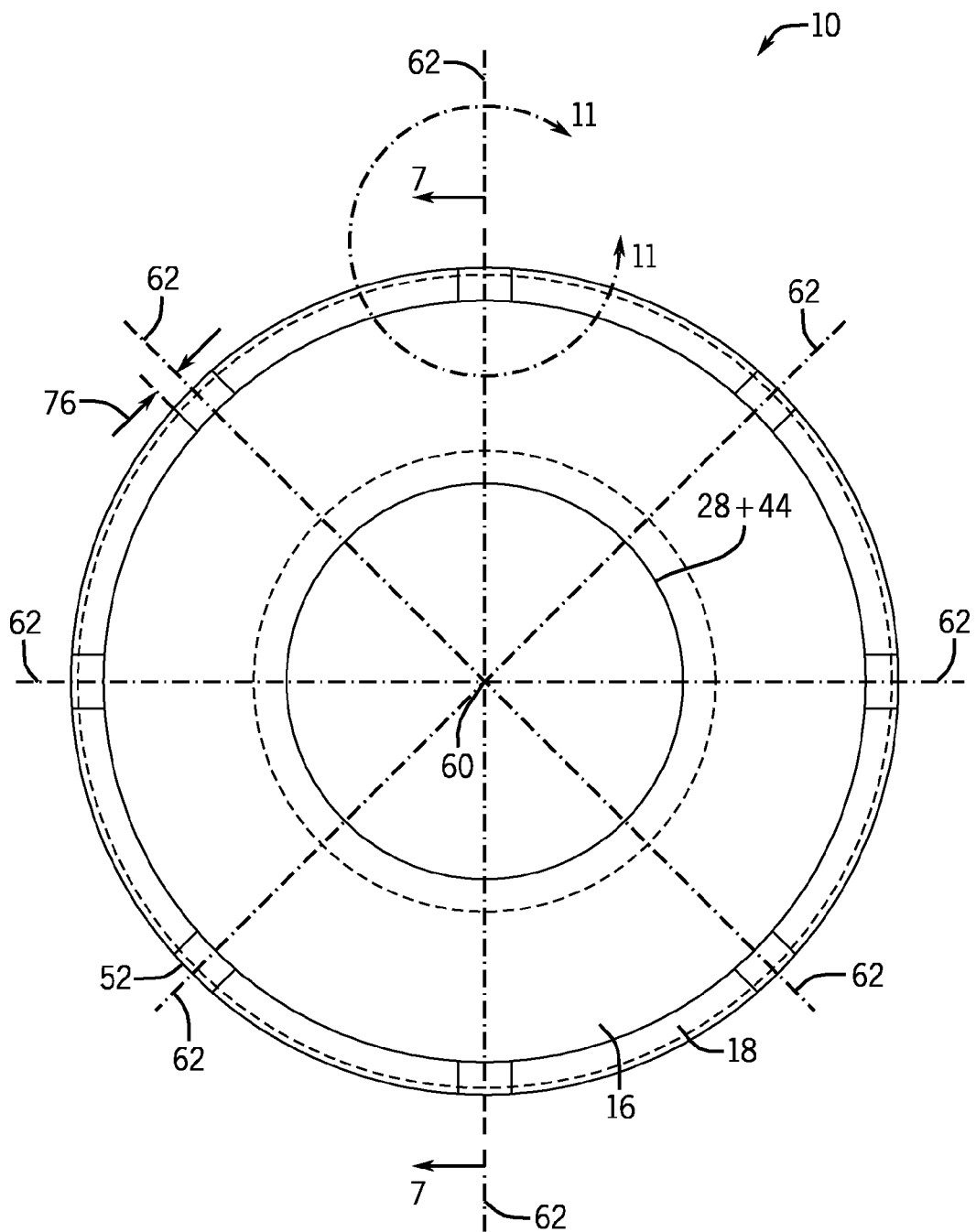
FIG. 6 is a front axial view of the current control assembly of FIG. 1, illustrating slots in the rotor at multiple circumferential positions about the rotational axis.

FIG. 6 is a front axial view of the current control assembly 10 is as viewed along a rotational axis 60 of the shaft 12 and/or the rotor/slinger 18. As such, during rotation of the rotor/slinger 18 in relation to the stator 16, the slots 52 may move in a clockwise and/or counterclockwise manner. As mentioned, such circumferential movement is what causes the slots 52 to impart centrifugal force onto any contaminants that may exit the drainage port 50 shown in the previous figures.

In the illustrated embodiment, the slots 52 of the rotor/slinger 18 are shown in relation to the series of radii 62. The series of radii 62 originate in the central portion of the shaft openings 28, 44 at the rotational axis 60 of the shaft 12. Further, while there exists a potentially limitless number of radii that may possibly extend from the rotational axis 60, FIG. 6 depicts the series of radii 62 as passing through the approximate center of each slot 52 to facilitate the discussion of various aspects of the slots 52. For example, in some embodiments the shape of the slots 52 may vary, and the shape may be defined by an angle of deviation 76 from the series of radii 62. In some embodiments, the angle of deviation 76 may be greater than about 0° and less than 90°, such as between approximately 15 to 75, 30 to 60, or about 45°. Thus, it should be noted that the slots 52 may be straight, angled, tapered, converging, diverging, circular, semicircular, and so forth compared to the radii 62. Specific embodiments of such relationships are described in further detail below.

Figure 7:
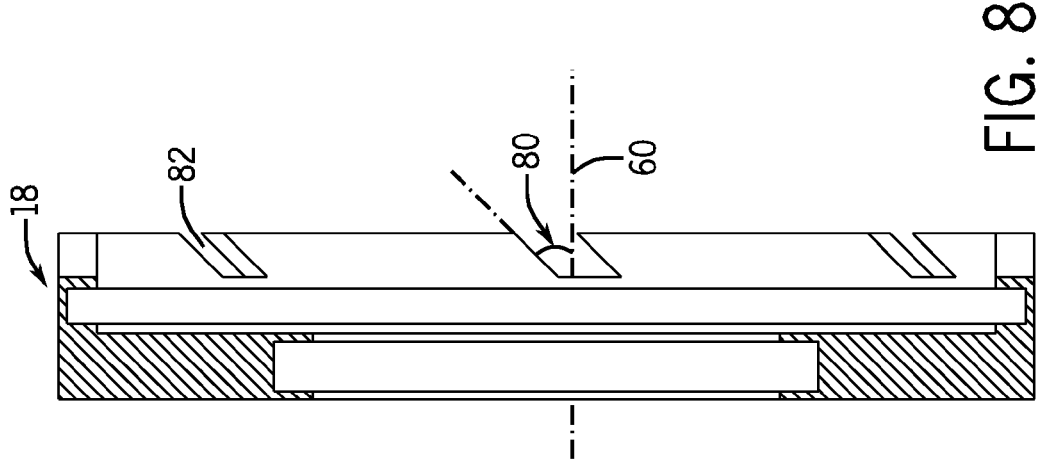
FIG. 7 is a cross-sectional side view of the current control assembly, taken along a line 7-7 of FIG. 6, illustrating the unique slots of the rotor.
Figure 8:
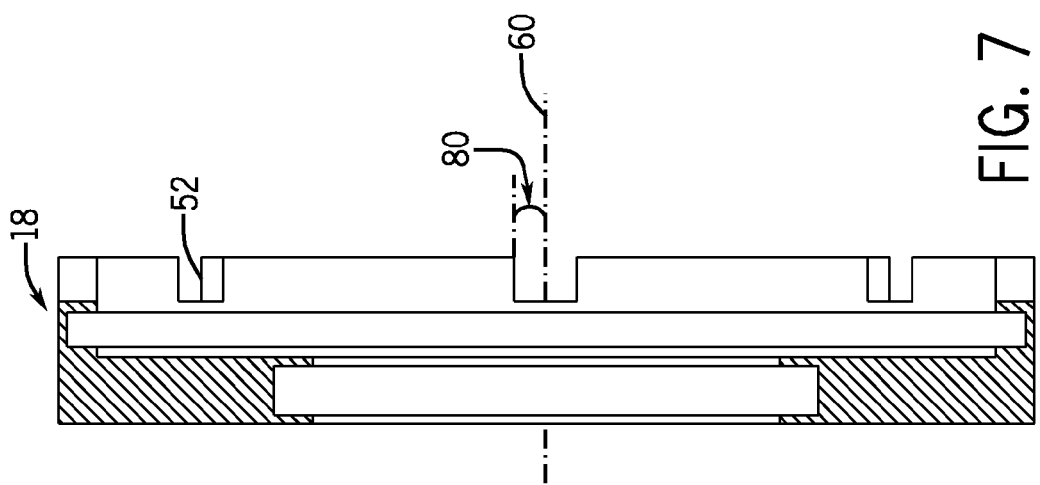
FIG. 8 is a cross-sectional side view of an alternative embodiment of FIG. 7, where the unique slots are disposed at a non-zero angle relative to the rotational axis of the shaft.

The slots 52, as mentioned, may have a similar relationship to the axis of rotation 60. That is, the slots 52 may have an angle of deviation 80 from the rotational axis 60, which is shown in FIGS. 7-8. Referring now to FIG. 7, a cross-sectional view of the rotor/slinger 18 is shown taken along the line 7-7 of FIG. 6. As illustrated in FIG. 7, the slots have the angle of deviation 80 in relation to the axis of rotation 60 that is substantially zero. That is, the slots 52 are illustrated as aligned with the rotational axis 60, and may also have a similar shape and size to the drainage port 50.

FIG. 8 is a similar illustration to that of FIG. 7 and depicts another embodiment of the rotor/slinger 18. However, rather than have the angle of deviation 80 of about zero, each slot 52 depicted in FIG. 8 has the angle 80 greater than about zero. Thus, in some embodiments, the angle of deviation 80 may be greater than zero, such as between approximately 15 to 75, 30 to 60, or about 45°. For example, the angle 80 may be 15, 20, 25, 30, 35, 40, 45, 50, 55, 60, 65, 70, 75 degrees or more. In other embodiments, the slots 52 may be curved rather than straight. Such curved slots 82 are depicted in FIGS. 9-10.

Figure 9:
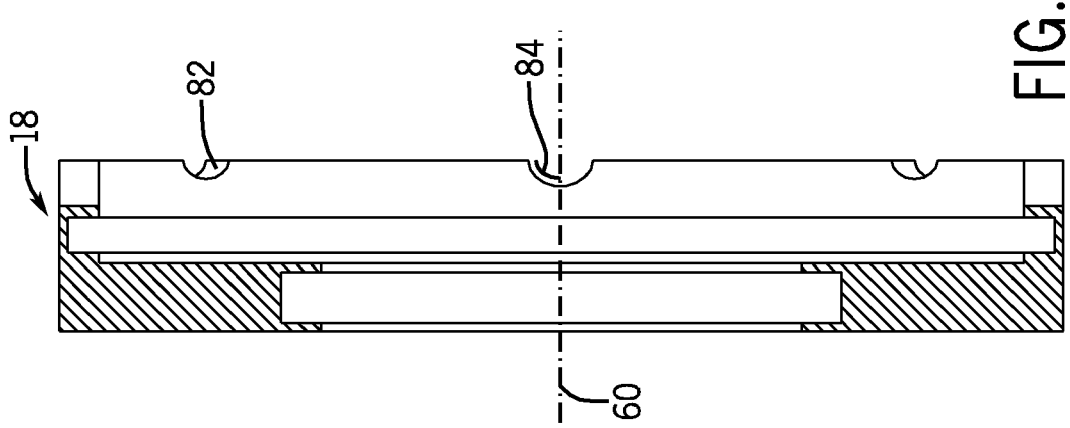
FIG. 9 is a cross-sectional side view of an alternative embodiment of FIG. 7, where the unique slots are semicircular.

FIG. 9 is an illustration of one embodiment of the rotor/slinger 18 having curved slots 82. In the illustrated embodiment, the slots 82 are approximately half-circles. That is, the slots 82 are defined by two quarter-circles on opposite sides of the rotational axis 60. Additionally, the slots 82 may have an angle of arc 84 that defines the size, shape, and/or extent of the curvature of the curved slots 82. In some embodiments, the angle of arc 84 may be greater than zero, such as between approximately 15 to 75, 30 to 60, or about 45°. For example, the angle 80 may be approximately 15, 20, 25, 30, 35, 40, 45, 50, 55, 60, 65, 70, 75 degrees or more. In some embodiments, the angle of arc 84 may suggest that the slots 82 are non-symmetric. That is, the slots 82 may be portions of circles such as an approximate quarter-circle, an approximate half-circle, an approximate three quarter-circle, and so forth. However, other embodiments may exist wherein the curved slots 82 are elliptical or irregularly shaped.

Figure 10:
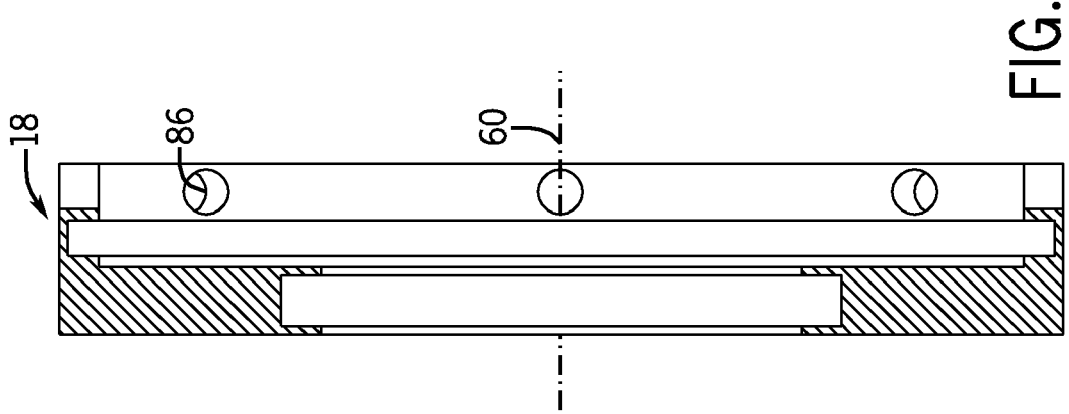
FIG. 10 is a cross-sectional side view of an alternative embodiment of FIG. 7, where the unique slots are circular openings.

One such alternative embodiment of the rotor/slinger 18 is illustrated in FIG. 10, which depicts circular orifices 86, rather than curved slots 82. As in FIG. 9, the rotational axis 60 bifurcates the circular orifices 86, such that either side of the axis 60 defines a half or semi-circle. Of course, the circular orifices 86, as with the curved slots 82, may have a different shape, such that the orifices 86 are elliptical or have a size anisotropy from one side to another, such as an egg-shape.

Figure 11:
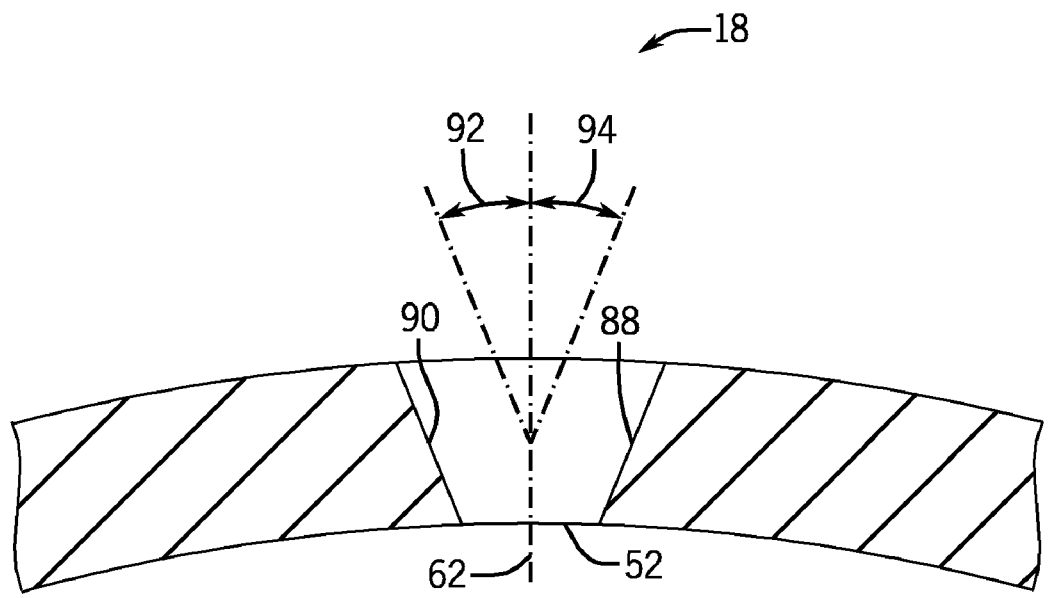
FIG. 11 is a partial cross-sectional front axial view taken within dashed circle 11-11 of FIG. 6, illustrating a converging or diverging slot.

Referring now to FIG. 11, which is taken within dashed circle 11-11 of FIG. 6, a partial cross-sectional view of a portion of the rotor/slinger 18 is shown. More specifically, FIG. 11 illustrates one embodiment of the slots 52, where each slot 52 has a non-zero angle of deviation 76 from the radius 62. In the illustrated embodiment, the slot 52 has a face 88 and a face 90. In the illustrated embodiment, both faces 88, 90 have an angle of deviation 92, 94 from the radius 62 that are equal. That is, both faces 88, 90 have equal magnitude of deviation from the radius 62.

However, while the magnitude of angles 92, 94 may be substantially the same, it can be appreciated that the faces 88, 90 may be considered as having a converging or diverging relationship relative to one another. That is, while the magnitudes of angles 92, 94 are about equal, their directionality is not. As such, the slot 52 may be considered to be tapered. It should be noted that the angles 92, 94 may have a different magnitude and/or directionality, such that angle 92 is smaller, larger, or about the same as angle 94. Similarly, the angle 92 may have a similar or different directionality than angle 94.

Figure 12:
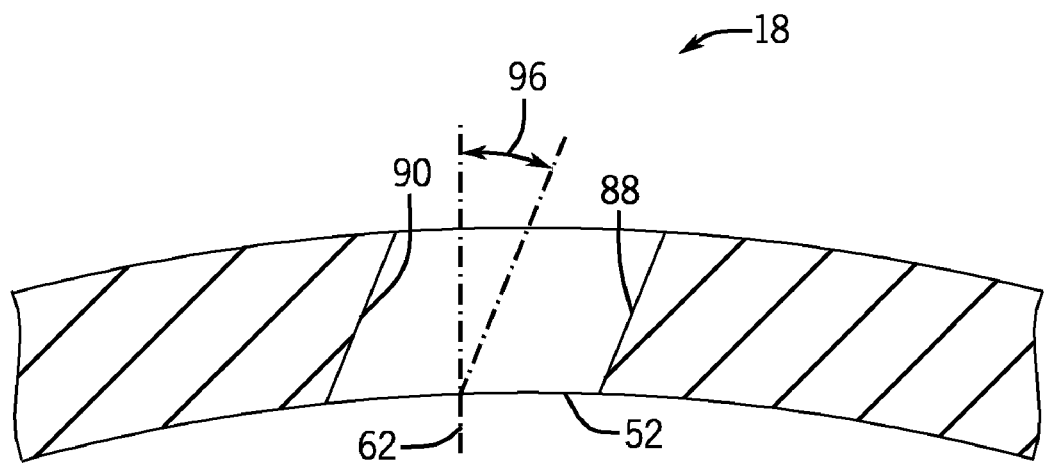
FIG. 12 is a partial cross-sectional front axial view of an alternative embodiment of FIG. 11, illustrating slots at a non-zero angle relative to a radius of the shaft.

FIG. 12 is a similar view of the rotor/slinger 18 to that illustrated in FIG. 11, with the faces 88, 90 illustrated as being configured in a substantially parallel relationship. Further, the faces 88, 90 have a non-zero angle of deviation 96 from the radius 62. It should be noted that unlike the embodiment illustrated in FIG. 11, the faces 88, 90 have angles which have common magnitude and directionality. That is, while the faces 88, 90 are slanted, they do not converge or diverge. Thus, the slot 52 may be considered as being slanted, rather than tapered.

Collectively, it should be noted that the slots 52, 82, and/or 86 may be any size, shape, or to any extent as suitable for proper shearing and slinging of any contaminants which may contact or enter the current control assembly 10. Therefore, the current control assembly 10 and more specifically the rotor/slinger 18 may have any one or a combination of the slots 52, 82, and/or 86. For example, the rotor/slinger may have one or more slots 52, one or more curved slots 82, one or more circular orifices 86, or any combination thereof. Moreover, the faces 88, 90 may be configured based upon implementation-specific requirements and designs. Further, the size of each slot 52, 82, 86 may be the same, or may vary.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
   a current control assembly, comprising:

a rotor comprising a first axial opening and a first radial opening, wherein the first radial opening is configured to discharge a contaminant;

a stator comprising a second axial opening, wherein the first and second axial openings are aligned with one another to receive a shaft; and a plurality of conductive filaments configured to transfer current between the current control assembly and the shaft.

2. The system of claim 1, wherein the first radial opening is configured to discharge the contaminant at least partially due to a centrifugal force during rotation of the rotor.

3. The system of claim 1, wherein the first radial opening is configured to pressurize an interior of the current control assembly to resist entry of the contaminant during rotation of the rotor.

4. The system of claim 1, wherein the rotor comprises a plurality of first radial openings circumferentially spaced along an annular wall of the rotor, and each first radial opening extends radially through the annular wall.

5. The system of claim 1, wherein the first axial opening comprises a slot extending axially along an annular wall of the rotor.

6. The system of claim 1, wherein the first radial opening is oriented at a first angle relative to a rotational axis of the shaft or a second angle relative to a radius of the shaft, and the first and second angles are between approximately 15 and 75 degrees.

7. The system of claim 1, wherein the first radial opening converges or diverges in a radial direction.

8. The system of claim 1, wherein the stator comprises a second radial opening configured to discharge the contaminant.

9. The system of claim 8, wherein the stator comprises an annular channel disposed adjacent the second radial opening.

10. The system of claim 8, wherein the first and second radial openings align with one another during rotation of the rotor relative to the stator.

11. The system of claim 1, wherein the plurality of conductive filaments is coupled to the stator.

12. The system of claim 1, wherein the current control assembly comprises a rotor O-ring disposed along the first axial opening, a stator O-ring disposed along the second axial opening, and an intermediate O-ring disposed between the rotor and the stator.

13. The system of claim 1, comprising an electromechanical device having the shaft extending through the first and second axial openings.

14. A system, comprising:
a current control assembly, comprising:
a first ring comprising a first shaft opening and a first discharge opening;
a second ring comprising a second shaft opening and a second discharge opening, wherein the first and second rings rotate relative to one another, and the first and second discharge openings align with one another to discharge a contaminant; and
a plurality of conductive filaments configured to transfer current between the current control assembly and a shaft.

15. The system of claim 14, wherein the first and second discharge openings non-continuously align with one another to discharge the contaminant, and the current control assembly is configured to discharge the contaminant at least partially due to a centrifugal force during rotation and to pressurize an interior of the current control assembly to resist entry of the contaminant during rotation.

16. The system of claim 14, wherein the current control assembly is configured to discharge the contaminant at least partially due to a centrifugal force during rotation.

17. The system of claim 14, wherein the current control assembly is configured to pressurize an interior of the current control assembly to resist entry of the contaminant during rotation.

18. A system, comprising:
a current control assembly, comprising:
a rotor comprising a first shaft opening and a plurality of first discharge openings;
a stator comprising a second shaft opening and a second discharge opening, wherein the first and second discharge openings periodically align with one another during rotation of the rotor to discharge a contaminant, the plurality of first discharge openings is configured to discharge the contaminant at least partially due to a centrifugal force during rotation of the rotor, and the plurality of first discharge openings is configured to pressurize an interior of the current control assembly to resist entry of the contaminant during rotation of the rotor; and
a plurality of conductive filaments coupled to the stator, wherein the plurality of conductive filaments is configured to transfer current between the current control assembly and a shaft.

19. The system of claim 18, wherein the first and second discharge openings periodically align with one another to create shear between the first and second discharge openings.

20. The system of claim 18, wherein the plurality of conductive filaments have diameters between about 100 and 900 microns, and are constructed from any one or a combination of silicon fibers, silicon nanotubes, carbon fibers, carbon nanotubes, graphene materials, conductive synthetic polymers, or conductive natural polymers.

* * * * *